United States Patent [19]
Campbell et al.

[11] 3,783,966
[45] Jan. 8, 1974

[54] STEERING SYSTEM FOR VEHICLES
[75] Inventors: John J. Campbell; Cullen P. Hart, both of Decatur, Ill.
[73] Assignee: Caterpillar Tractor Co., Peoria, Ill.
[22] Filed: Aug. 18, 1972
[21] Appl. No.: 281,919

[52] U.S. Cl. .......................... 180/79.2 R, 280/111
[51] Int. Cl. .......................... B62d 5/06, B62d 7/00
[58] Field of Search ............... 180/79, 79.1, 79.2 R, 180/79.3, 79.4, 79.5, DIG. 1, DIG. 2; 280/111

[56] References Cited
UNITED STATES PATENTS

| 3,398,808 | 8/1968 | Heckenhauer | 280/111 X |
| 2,216,930 | 10/1940 | Altemus | 180/79.3 X |
| 2,323,682 | 7/1943 | Schoenrock | 180/79 X |
| 2,625,232 | 1/1953 | Lado | 280/111 X |
| 2,796,945 | 6/1957 | Dye et al. | 180/79.2 R |
| 3,446,305 | 5/1969 | Cannon | 280/111 X |
| 3,527,316 | 9/1970 | Jones et al. | 180/79.2 R UX |

Primary Examiner—Robert S. Ward, Jr.
Attorney—Ralph E. Walters

[57] ABSTRACT

A steering system for vehicles includes an oscillating axle, a pair of wheel lean members individually transversely rockably coupled to the opposite ends of the axle, a pair of king pins associated with each of the wheel lean members, a pair of spindle housings individually pivotally movable on each wheel lean member through the king pins and having an integral steering arm thereon, a pair of wheels individually rotatable with respect to the spindle housings, a tie rod directly connecting each of the steering arms, and at least one steering cylinder connected between one of the steering arms and the axle to provide a high angle of steer for increased vehicle maneuverability and a minimum of interaction between wheel lean and steering functions.

13 Claims, 4 Drawing Figures

STEERING SYSTEM FOR VEHICLES

BACKGROUND OF THE INVENTION

Several wheel-type vehicles, such as conventional motor graders, have an oscillating front axle with wheel lean members rockably disposed on opposite ends of the axle on a longitudinal pivot pin. These lean members are typically provided with a pair of outwardly oriented flanges to provide a king pin mounting of a spindle system on which a wheel is rotatably mounted. Further, the upper extremities of these wheel lean members are connected together by a wheel lean link, and a hydraulically actuated extendible cylinder is provided to lean this mechanism.

One of the major problems that such axles experience is the excessive interaction between the wheel lean and steering functions. For example, if such a motor grader is making a turn to the left, the angle of steer should not be affected to any significant degree even though the wheels are leaned during the turn to counter the forces being felt by the motor grader blade or to counter the drift of the grader due to it being operated on side slopes. Not only should these actions be substantially independent, but also the system should be effective for a high angle of steer so that the motor grader can turn within a small radius for increased maneuverability. It is also important that neither the wheel lean nor the steering functions should be affected by the oscillation of the axle as the vehicle traverses uneven terrain.

Another problem arises in that when steering the inboard wheel must turn to a greater angle than the outboard wheel to obtain a truer wheel rolling motion. In order to control the pivoting of the front wheels so that their axes would intersect each other near the axis of the rear wheels, various changes must be made to the steering geometry. These correctional changes, referred to as the Ackermann form of steering linkage, result in a more desirable control of the vehicle under a variety of operating conditions, but are perfect for only one turning radius. Therefore, the lengths of the steering arms and associated components must be chosen so that the mean of the errors throughout the steering range is maintained at a minimum.

Another difficulty is that the joints of prior art axle assemblies are frequently subjected to non-uniform torque loading by the action of the hydraulically extendible cylinders used for the wheel lean and steering functions, or by the reverse action of shock loads transmitted through the wheels and into the linkage. Such unequal loading results in excessive twisting of the components to the point of resulting in their premature failure.

Further, earthmoving equipment which can benefit by such a steering system is becoming larger, is more heavily horsepowered, and is subjected to greater operational abuse. As a result, the front axles thereof must be extremely rugged, have a high ground clearance, and be relatively simple in constuction in order to be of maximum value to the user at a minimum overall cost.

SUMMARY AND OBJECTS OF THE INVENTION

Therefore, to overcome the above-noted problems, it is the object of this invention to provide a steering system for a vehicle having increased maneuverability with a minimum of interaction between the wheel lean and steering functions, as well as an optimum built-in steering angle correction.

Another object of this invention is to provide a relatively simple axle construction which lends itself to a rugged fabrication at a relatively low cost.

Another object of this invention is to provide an axle construction which has a high ground clearance and a minimum exposure of the critical components to possible damage by large rocks and dirt clumps over which the vehicle may be traveling.

Another object is to provide a relationship of the wheel lean and steering hydraulic cylinders to the primary pivot axes such that transmitted forces are essentially in line with the yokes and other elements of the axle assembly to minimize twisting loads.

Other objects of this invention will become apparent from the following description and accompanying drawings.

DESCRIPTION OF THE PREFERRED EMBODIMENT

Figure 2:
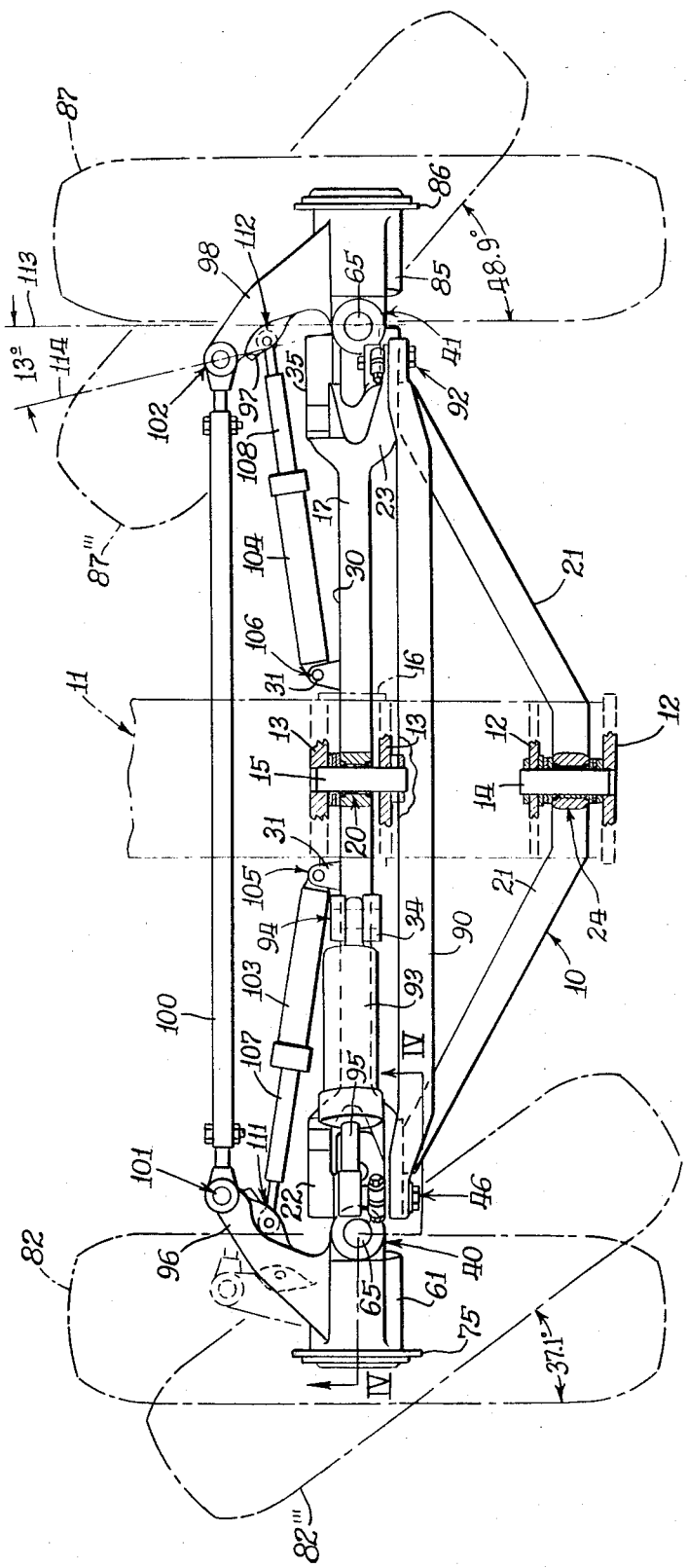
FIG. 2 is a top plan view of the oscillating axle of FIG. 1.

With reference to the drawings, an oscillating axle assembly indicated generally by the reference numeral 10 is shown disposed on the front of an elongated vehicle frame 11 having a longitudinal axis substantially aligned with the direction of vehicle movement. As best shown in FIG. 2, a pair of forwardly disposed, transversely arranged, vertical plates 12 and a pair of rearwardly disposed, transversely arranged, vertical plates 13 on the vehicle frame are adapted to respectively receive a pair of longitudinally aligned pivot pins 14 and 15 on which the axle assembly oscillates. A pair of axle stop members 16, individually disposed on opposite sides of the frame 11, limit the angle of oscillation of the axle assembly to approximately 16° from either side of its horizontally disposed condition.

The axle assembly 10 includes an elongated axle 17 of rectangular cross section which is transversely and rockably coupled to the vehicle frame 11 on the pin 15 by means of a conventional sealed bearing arrangement shown generally at 20. For increased strength, the axle assembly also includes a pair of forwardly and inwardly angled brace bars 21 which are individually secured at their rearward extremities to a pair of integral yoke members 22 and 23, respectively, disposed on the outer opposite ends of the axle 17. The forward extremities of the brace bars are rockably coupled to the vehicle frame on the pin 14 by means of a sealed bearing arrangement 24.

On a rearward face 30 of the axle 17 are disposed a pair of horizontally arranged and rearwardly extending ears 31 in spaced symmetrical relation adjacent to the opposite sides of the frame 11. An upper surface 33 of the axle further includes a pair of longitudinally spaced upwardly extending ears 34.

As best shown in FIG. 2, each of the yoke members 22 and 23 has a substantially vertically extending rear face 35 providing an overload limiting surface for extremely high angles of steer, as will be described more fully below. These yoke members individually pivotally mount a pair of right and left bifurcated wheel lean members shown generally at 40 and 41, respectively, for transverse rockable movement.

Figure 3:
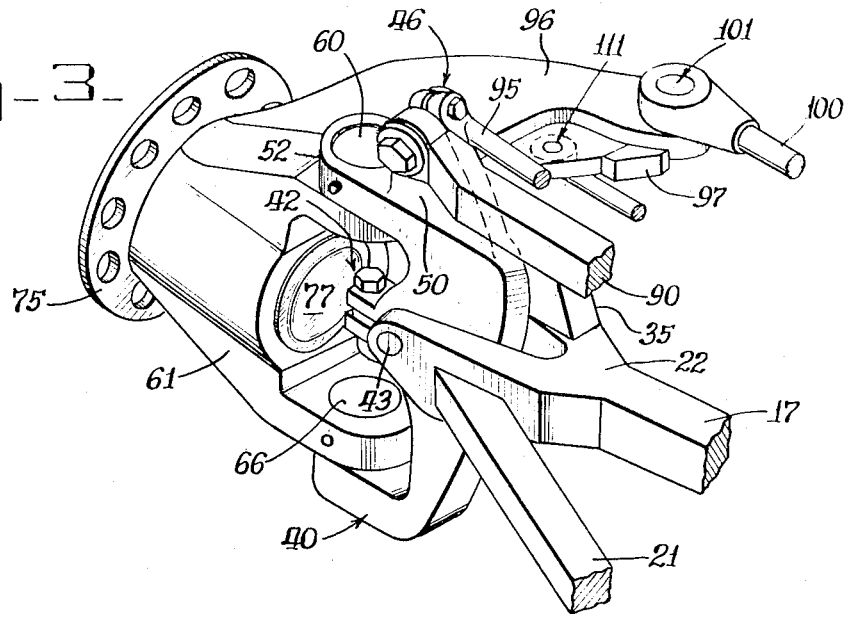
FIG. 3 is a somewhat enlarged isometric view of one end of the oscillating axle with portions broken away for illustrative convenience.
Figure 4:
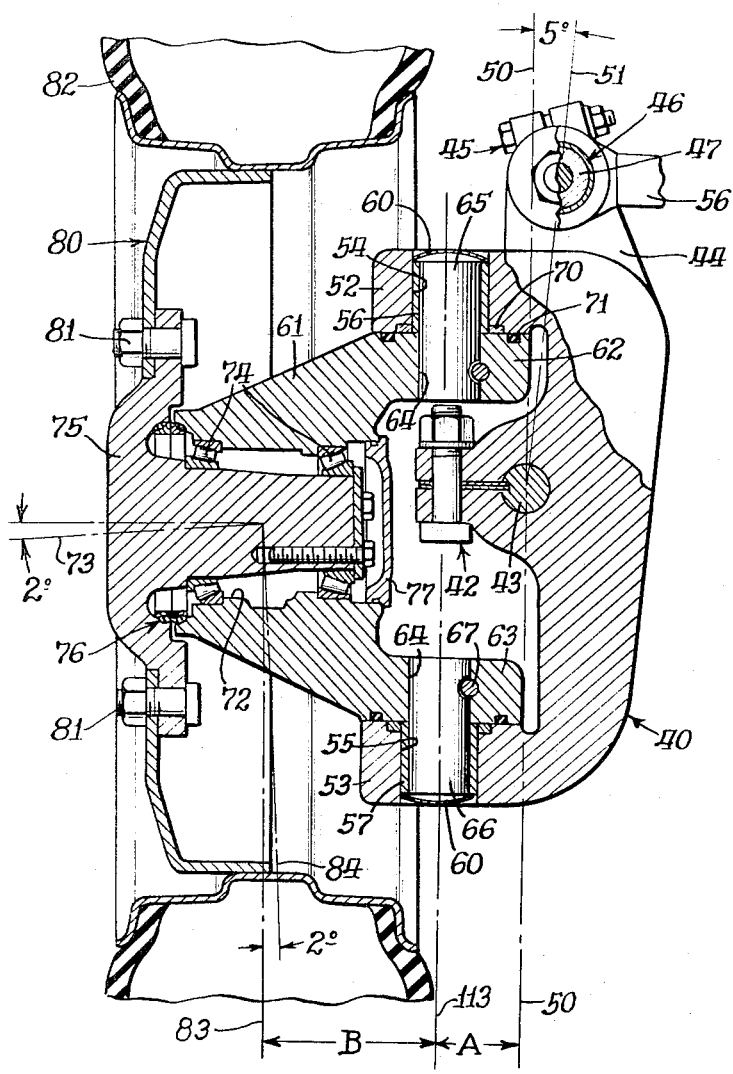
FIG. 4 is a further enlarged vertical sectional view through the end of the oscillating axle shown in FIG. 3 taken generally along the line IV—IV of FIG. 2.

With particular reference to the right wheel lean member 40 shown in FIGS. 3 and 4, an outwardly disposed clamping arrangement is shown generally at 42 for removably securing such right wheel lean member on a wheel lean pin 43. An upwardly directed integral arm 44 contains another clamping arrangement shown generally at 45 for an upper pivotal joint 46 in which a longitudinally oriented pin 47 is removably secured to the wheel lean member. With the axle 17 horizontally disposed and with no wheel lean, an angle of approximately 5° is formed between a true vertical longitudinal plane 50 passing through the pin 43 and a plane 51 passing through the axes of the pins 43 and 47.

Referring to FIG. 4, the bifurcated right wheel lean member 40 includes an outwardly directed upper flange 52 and an outwardly directed lower flange 53 combining to provide a pair of substantially vertically aligned bores 54 and 55 adapted individually to contain a pair of sleeve-type bearings 56 and 57, respectively. The sleeve bearings are preferably of the self-lubricating type, and are individually outwardly protected from dirt by a protecting cover 60. A bifurcated spindle housing 61 has an inwardly directed upper flange 62 and an inwardly directed lower flange 63 contiguously associated within the respective flanges 52 and 53 of the wheel lean member. The spindle housing further has a pair of aligned bores 64 adapted individually to receive a pair of king pins 65 and 66 in oppositely outwardly extended relation. The king pins are removably secured within their respective bores 64 by a lock pin 67, and are disposed for pivotal movement within the bearings 56 and 57 of their associated flanges 52 and 53 to allow steerable rotation of the spindle housing 61 with respect to the wheel lean member 40. A thrust washer 70 and a face seal 71 are disposed between the associated flanges for extending the service life of this pivotal connection.

The bifurcated spindle housing 61 also includes a stepped hollow bore 72 which is spaced substantially equidistantly between the flanges 62 and 63, and has a downwardly directed axis 73. A pair of spaced antifriction bearings 74 are received within the stepped hollow bore and rotatably support a spindle 75 therewithin. This relationship of the spindle within the spindle housing permits the bearings to rotate more slowly for increased bearing service life when compared to outwardly rotating assemblies. A seal group shown generally at 76 and a cap member 77 serve to contain lubricating fluid within the bearing area.

A wheel rim assembly 80 is removably secured to the spindle 75 by a plurality of retaining bolts 81, and a tire 82 is mounted thereon in the usual manner. The downwardly directed axis 73 of the spindle provides a 2° camber angle for the tire 82, as respectively shown between a vertical plane 83 and a central plane 84 of the tire passing intermediate the bearings 74. This slight camber angle decreases steering effort.

Figure 1:
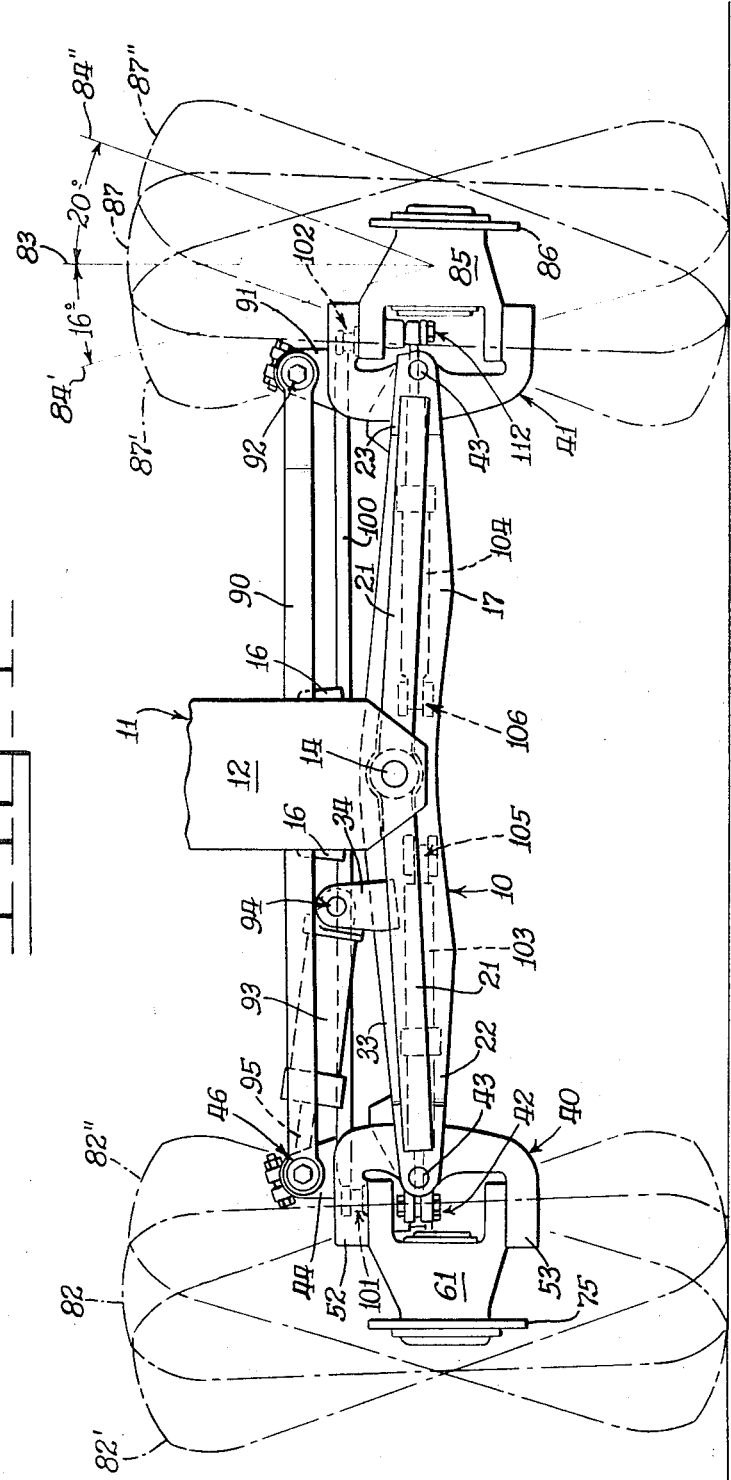
FIG. 1 is a front elevational view of an oscillating axle embodying the vehicle steering system of this invention with the tires shown in broken lines for illustrative clarity.

As shown in the righthand portion of FIG. 1, the left side of axle assembly 10 contains a bifurcated spindle housing 85, a spindle 86, and a tire 87 essentially identical to that described with respect to the right side. A horizontally disposed wheel lean link 90 transversely connects the arm 44 and the pivotal joint 46 of the right wheel lean member 40 with a similar upwardly directed arm 91 and a pivotal joint 92 on the left wheel lean member 41. A wheel lean actuating cylinder 93 is connected at a pivot joint 94 to the axle 17 as by the ears 34, and an actuating rod 95 extends from the cylinder to pivotally connect with the pin 47 at the joint 46. Extension of the actuating rod 95 permits simultaneous leaning of both wheel lean members 40 and 41 in a counterclockwise direction on the respective pivot pins 43 through the wheel lean link 90.

With continuing reference to FIG. 1, the axle assembly 10 includes a wheel lean trapezoidal relationship which assures clearance between the inside surfaces of the tires 82 and 87 adjacent joints 46 and 92 and wherein the distance between the pivot pins 43 at the axle extremities is slightly greater than the parallel distance between joints 46 and 92 at the ends of the wheel lean link 90. With the axle 17 horizontally disposed, this results in an angle of approximately 5° between the vertical plane 50 passing through the axis of pivot pin 43, as described above in connection with FIG. 4, and the plane 51 passing through the axis of the pivot pin 43 and the pivotal joint 46. A similar 5° angle of inclination is experienced on the left side.

In connection with the steering system shown more clearly in FIGS. 2 and 3, the right spindle housing 61 preferably includes an integral rearwardly and inwardly angled steering arm 96 having an inwardly disposed stop surface 97 thereon, though the arm may alternately be removably secured thereto. The right steering arm 96 is connected to a similar steering arm 98 integral with the left spindle housing 85 through a tie rod 100 having an adjustable length and a pair of self-aligning ball joints on the ends thereof as shown generally at 101 and 102. A pair of horizontally disposed steering cylinders 103 and 104 are respectively mounted on the axle 17 through the ears 31 and a pair of self-aligning pivot bearings or ball joints shown generally at 105 and 106. A pair of extendible piston rods 107 and 108 are respectively connected to the steering arms 96 and 98 intermediate the ends thereof through another pair of self-aligning pivot bearings or ball joints shown generally at 111 and 112. This connection of the piston rods to the steering arms independent of the tie rod connections at 101 and 102 allows geometric flexibility in the design of the linkage proportions and disposition thereof which is one of the features of the subject invention.

It should also be appreciated that only one of the steering cylinders 103 or 104 and its corresponding piston rod can be used to replace the double steering cylinder arrangement illustrated without departing from the spirit of the subject invention.

As shown in FIG. 2, the oscillating axle assembly of the present invention provides a steering system which includes a steering geometry trapezoidal relationship wherein the distance between the left and right king pins 65 or 66 is greater than the parallel distance between the end connection 101 and 102 of the tie rod 100. With the tires 82 and 87 positioned for substantially straight-line travel, there is provided a built-in steering correction angle of approximately 13° between a longitudinally disposed vertical plane 113 through the king pins and a vertical plane 114 through the king pins and the tie rod connection 102. This relationship provides a common steering center for both wheels near the axis of the rear wheels during one predetermined intermediate turning radius and permits the inboard wheel to turn more sharply than the outboard wheel to extend tire life by providing a more nearly true wheel rolling motion.

OPERATION

While the operation of the present invention is believed clearly apparent from the foregoing description, further amplification will subsequently be made in the following brief summary of such operation. As shown in FIG. 1, the axle 17 may be noted as having a high arch profile allowing the vehicle to traverse over very rough terrain with a relatively high ground clearance. For example, the lowest portion of the axle assembly 10 centrally between the wheel lean members 40 and 41 is elevationally close to the elevation of the longitudinal pins 14 and 15 of the axle assembly. The axle 17, the angle brace bars 21, and the wheel lean link 90 are not only of rugged rectangular construction, but are disposed to maximize protection for the steering cylinders 103 and 104, as well as the wheel lean cylinder 93.

With extension of the wheel lean cylinder rod 95, the wheel lean members 40 and 41 move in a counterclockwise direction with respect to their respective pivot pins 43 so that the wheels are positionable to their approximate maximum inclination as shown by the broken line positions 82' and 87'. Full retraction of the cylinder rod 95 thereafter positions the wheel lean members and the tires toward the maximum clockwise direction as shown by the broken line positions at 82'' and 87''. Because of the trapezoidal wheel lean geometry mentioned heretofore, the central plane 84 of the tires may be leaned through a range of approximately 20° outwardly to approximately 16° inwardly at the top from the true vertical plane 83 of the tire as shown at the righthand portion of FIG. 1.

When the wheel lean members 40 and 41 are transversely rocked on the wheel lean pivot pins 43 as noted above, the steering geometry is influenced to only an extremely limited degree. To accomplish this, the elevational disposition of the steering cylinder pivotal connections or ball joints 105, 106, 111, and 112 are arranged in a horizontal plane passing approximately through the wheel lean pivot pins as may be visualized with respect to the elevation view of FIG. 1. The relatively higher elevation of the self-aligning pivotal connections 101 and 102 at the ends of the tie rod 100 are independently chosen so that the tie rod is able to clear the hydraulic steering cylinders 103 and 104 at the extreme lean conditions and is less vulnerable to damage during maneuvering of the vehicle over rough obstacles. It is the tie rod that determines the relative angularity between the left and right wheels.

FIGS. 1 and 4 also show that the wheel lean pivot pins 43 are disposed at an elevational position to insure clearance between the top of the wheel lean arms 44 and 91 and the inside annular surface of the wheel rim assemblies 80, and to further be compatible with the effective length of the wheel lean cylinder between the pivotal connections 46 and 94 within the available space provided.

Because the wheel lean cylinder rod 95 is substantially transversely in line with the king pins 65 and 66 as shown in FIG. 2, detrimental loading forces and overturning or steering forces from wheel lean are minimized. Further, the wheel spindle housing 61 and the wheel spindle 75 are centered transversely with respect to the main axle beam 17 so that the vehicle weight produces substantially no torsional loading of the axle.

Since the inboard wheel on a turn must turn through a greater angle than the outboard angle, the axle assembly 10 of the subject invention includes the aforementioned built-in steering correction angle set forth as approximately 13° with respect to FIG. 2. This angle also must be chosen to take into account such factors as the wheel base of the entire vehicle and the distance between the centerlines of the king pins. If the inboard wheel is assumed as establishing the turning radius, the angular movement of the axis of the outboard wheel necessary to coincide with the intersection of the axes of the inboard wheel and rear wheels is referred to herein as the Ackermann Error Angle. There is only a slight Ackermann Error Angle for all degrees of steering utilizing the geometry of the present invention. If a maximum turn to the left is made under a condition of no wheel lean, the wheels 82 and 87 are rotated different amounts about the king pins 65 and 66 to their respective broken line positions 82''' and 87''' and with the wheels assuming the following typical angles from the longitudinal vertical plane 113.

EXAMPLE:

| Left Wheel Turn Angle | Right Wheel Turn Angle | Ackermann Error Angle |
|---|---|---|
| 48.9° | 37.1° | − 3.1° |

This negative Ackermann Erorr Angle at such maximum turn angle indicates that the outboard wheel did not turn far enough. However, this error represents a substantially maximum value, since at some intermediate steering angle corresponding to one predetermined vehicle turning radius the error is zero, with the axes of the wheels passing through the same point on the pivot axis of the rear wheels.

With the axle assembly of the present invention, the angular disposition of each steering cylinder 103 or 104 is independent of the connection between the steering arms 96 and 98 and the tie rod by virtue of having two separate pivotal connection points, such as for example at the connections 101 and 111. Therefore, the angle of the cylinders relative to the axle 17, and more particularly the arcuate movement of the ball joints 111 or 112 as the steering cylinder rods 107 and 108 are reciprocated between the maximum extended and maximum retracted positions can be established so that the motion of the ball joints 111 or 112 is substantially horizontal and in a plane passing through the wheel lean pins 43 as shown in the righthand portion of FIG. 1 to minimize the effect of lean on steering. As shown in FIG. 4, the longitudinal vertical plane 50 through the lean pin 43 is positioned relatively close to the longitudinal vertical plane 113 passing through the king pins 65 and 66 as represented by distance "A" therebetween. This distance is chosen for minimum steering error with respect to wheel lean. Geometric errors resulting from leaning the wheels about the pins 43 during maximum turns to the right or left are substantially balanced by properly choosing the distance "A" and relating the 0° steer or straight line travel position of the ball joints 111 or 112 thereto. The vertically spaced nature of the king pins 65 and 66 makes it possible for the wheel lean pivot pins 43 to be positioned further outwardly than with a single king pin and to provide a relatively small distance "A." The angular relationships of the wheels 82 and 87 to the longitudinal vertical plane 113 set forth above with respect to a maximum steering turn are substantially maintained at these same values throughout the entire range of wheel lean movement, which indicates that there is a minimum of interaction between the wheel lean and steering functions utilizing the axle assembly of the present invention.

The distance between the longitudinal vertical plane 113 passing through the king pins 65 and 66 and the longitudinal vertical plane 83 passing through the center of each wheel as represented by the letter "B" in FIG. 4 is also chosen on the basis of several considerations. For example, while it is desirable for distance "B" to be small in order to reduce the severity of shock loads from being transmitted from a rough ground surface condition and the tire 82 back to the reacting steering cylinder rod 107 through the spindle 75 and the spindle housing 61, this distance must be large enough for clearance between the inside of the tire adjacent the rim ssembly 80 and the various elements of axle assembly 10 as the wheels are leaned or steered. The ratio of distance "B" to distance "A" is preferably in the range from two to three.

With the wheels at a condition of maximum steer, as illustrated by the broken line positions of the tires at 82''' in FIG. 2, suitable internal stops (not shown) are provided within the steering cylinders 103 or 104 to limit the maximum extension of the piston rod 107 or 108. However, under certain conditions of considerable wheel lean and externally applied shock loads to the tires, it has been found desirable to limit the travel of the steering arms 96 and 98 toward the axle 17 by an alternate method. Such limiting is achieved by allowing the stop surfaces 97 to contact the rear faces 35 of their respective yoke members 22 or 23.

In view of the foregoing, it is readily apparent that the structure of the present invention provides an improved oscillating axle assembly which affords only a minimum of interaction between the wheel lean and steering functions, with optimum built-in steering angle correction. It is of relatively rugged simple construction having maximum resistance to detrimental twisting forces while affording excellent ground clearance.

While the invention has been described and shown with particular reference to the preferred embodiment, it is apparent that variations might be possible that would fall within the scope of the present invention, which is not intended to be limited except as defined in the following claims.

What is claimed is:

1. A steering system for vehicles comprising,
   an elongated frame having a longitudinal axis substantially aligned with a predetermined forward and rearward direction of earth traversing movement of such a vehicle,
   axle means rockably coupled to said frame transversely of said axis having opposite outer ends,
   a pair of wheel lean members individually rockably coupled to said opposite ends of said axle means for swinging movement in a substantially upright plane,
   wheel lean actuation means pivotally mounted on said axle means and effective to rock said wheel lean members relative to said axle means,
   wheel mounting means pivotally mounted on said wheel lean members for swinging movement through a plane substantially normal to said plane of pivotal movement of said wheel lean members and having a steering arm thereon,
   tie rod means directly connecting each of said steering arms, and
   power means pivotally interconnecting at least one of said steering arms and said axle means and being disposed in substantially horizontally coplanar relation to said axle means in order to provide a minimum interaction between the wheel lean and steering functions.

2. The steering system of claim 1 wherein said tie rod means is a single tie rod pivotally connected to each of said steering arms independently of the pivotal connection of said power means to at least one of said steering arms.

3. The steering system of claim 1 wherein said power means comprises at least one cylinder and associated extendible piston rod substantially horizontally rearwardly coupled to said axle means and one of said steering arms for maximum protection against objects encountered during said earth traversing movement of the vehicle.

4. The steering system of claim 1 including a pair of horizontally longitudinally disposed wheel lean pins for individually rockably mounting said wheel lean members on said outer ends of said axle means, and a pair of vertically spaced king pins individually positioned above and below each of said wheel lean pins and in relatively transversely closely spaced relation thereto whereby errors in steering due to rocking of said wheel lean members is minimized.

5. The steering system of claim 4 wherein said power means comprises at least one extendible hydraulic cylinder connected to said steering arm at an elevation substantially coinciding with said wheel lean pin whereby the rocking of said wheel lean members on said axle results in only a minimum influence on the steering angle.

6. The steering system of claim 1 wherein said wheel mounting means includes a spindle housing having a cylindrical bore and bearing means disposed in said bore, a spindle rotatably received in said bearing means, and a wheel removably secured to said spindle.

7. The steering system of claim 1 wherein said axle means includes an elongated axle having bifurcated opposite ends individually adapted to embrace said wheel lean member, and means individually pivotally mounting said wheel lean members on said ends of the axle.

8. The steering system for vehicles of claim 7 wherein said wheel lean actuation means is pivotally disposed between at least one of said pair of wheel lean members and said axle in elevationally spaced substantially coplanar relation with said bifurcated opposite ends of said axle.

9. The steering system of claim 8 including a wheel lean link, and an upwardly extending arm on each of said wheel lean members pivotally attached to said link whereby said link is substantially horizontally disposed at an elevational position forwardly adjacent to said wheel lean actuation means in shielding relation during said forward earth traversing movement of the vehicle.

10. A steering system comprising,
an elongated frame having a longitudinal axis,
an axle transversely rockably coupled to said frame and having a pair of outwardly disposed opposite ends,
a longitudinally oriented wheel lean pin associated with each of said opposite ends,
a bifurcated wheel lean member transversely and rockably coupled to each of said opposite ends of said axle by said wheel lean pin,
a wheel lean cylinder pivotally mounted on said axle and effective to rock said wheel lean members relative to said axle,
king pin means associated with said wheel lean member,
a bifurcated spindle housing having a steering arm thereon and cooperatively associated with said king pin means for pivotal turning of said spindle housing on each of said wheel lean members and so that said wheel lean pin is transversely closely spaced with respect to said king pin means for minimum steering error with respect to wheel lean,
wheel means adapted for rotation with respect to each of said spindle housings, and
a steering cylinder connected between at least one of said steering arms and said axle.

11. The steering system of claim 10 wherein said king pin means is an upper pin and a lower pin pivotally joining said bifurcated spindle housing and said bifurcated wheel lean member.

12. The steering system for vehicles of claim 11 wherein said wheel lean pin is positioned in a substantially horizontal plane substantially intermediate said upper pin and said lower pin.

13. A wheel mounting arrangement for a vehicle comprising;
pivotal connection means on the vehicle;
bifurcated wheel lean means rockably mounted on said pivotal connection means and having an outwardly directed upper flange and an outwardly directed lower flange substantially equidistantly spaced from said pivotal connection means;
bifurcated spindle means having an integral steering arm, an inwardly directed upper flange, and an inwardly directed lower flange with the flanges being substantially equidistantly spaced from said pivotal connection means between said upper and lower flanges of said wheel lean means;
a pair of vertically spaced king pins individually pivotally coupling said upper flanges and said lower flanges of said spindle means and said wheel lean means, respectively;
wheel means adapted for rotation on said spindle means; and
powered extendible retractable steering means pivotally attached to said steering arm at an elevation corresponding with said pivotal connection means so that the influence of wheel lean is minimal on the angle of steer of said wheel means.

* * * * *